Figure 1:
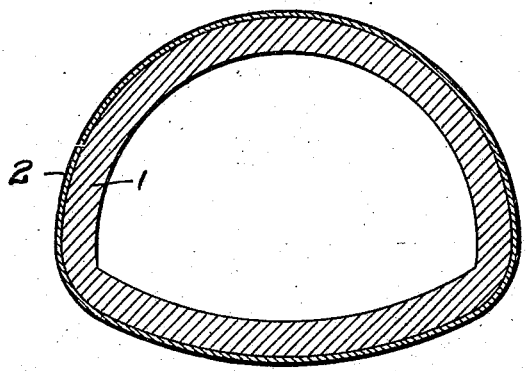

Mar. 13, 1923.

J. P. SNEDDON.
FURNACE.
FILED NOV. 4, 1921.

1,448,161.

2 SHEETS—SHEET 1.

Mar. 13, 1923.

J. P. SNEDDON.
FURNACE.
FILED NOV. 4, 1921.

1,448,161.

2 SHEETS—SHEET 2.

WITNESSES
J. Herbert Bradley.

INVENTOR

Patented Mar. 13, 1923.

1,448,161

UNITED STATES PATENT OFFICE.

JAMES P. SNEDDON, DECEASED, LATE OF BAYONNE, NEW JERSEY, BY JAMES STUART SNEDDON, OF BAYONNE, NEW JERSEY, AND EDWARD R. STETTINIUS, OF NEW YORK, N. Y., EXECUTORS, ASSIGNORS TO PITTSBURGH SEAMLESS TUBE COMPANY, OF BEAVER FALLS, PENNSYLVANIA, A CORPORATION OF PENNSYLVANIA.

FURNACE.

Application filed November 4, 1921. Serial No. 512,951.

*To all whom it may concern:*

Be it known that JAMES P. SNEDDON, deceased, late a citizen of the United States, resident of Bayonne, in the county of Hudson and State of New Jersey, has invented a new and useful Furnace, of which the following is a specification.

The invention relates to stationary horizontal or approximately horizontal industrial furnaces and ovens of various kinds, such as annealing furnaces for steel products, metal heating furnaces for forging, rolling and tube mill work, metal refining furnaces, reverberatory furnaces, open hearth furnaces, roasting furnaces, malleable iron furnaces, soaking pit furnaces, glass melting tanks, glass annealing furnaces, by-product coke furnaces, and other similar industrial heating furnaces or ovens which ordinarily are built of refractory brick or blocks to provide a heating chamber comprising a hearth or floor, side walls, and a roof or crown.

Heretofore, furnaces and ovens of the character described have been of substantially rectangular cross-section, built of refractory brick or blocks and comprising vertical side walls and an arched crown or roof sprung between or on top of the side walls, and of such size that the resulting stresses required that their walls be thick and held together by various arrangements of buck stays and tie bolts, skew-backs, or suspended metallic arch hangers or supports. When such furnaces or ovens, built according to the usual practice, are fired or heated up, the refractory lining expands, the joints open up and the bricks crack, thus exposing larger areas of the refractory brick or blocks for the absorption of heat, with the result that the refractory lining disintegrates or burns out, the roof or crown rapidly weakens and collapses, and the side walls become cracked and open at the joints with a resultant large loss or dissipation of heat. Furthermore the expansion of the refractory lining makes it necessary to loosen the tie rods in order to prevent the buck stays or tie rods from breaking or the wall from collapsing. Furthermore this prior construction requires such thickness of wall and roof or crown and such heavy and strong buck stays, tie rods, and the like, in order to secure reasonable strength and durability, that the cost of construction is correspondingly high, and this together with the short life of furnaces so constructed renders them expensive. The opening up of the seams in the wall and the cracking and dropping out of the brick also render such furnaces uneconomical in operation due to the large dissipation of heat.

In an application of even date herewith, Serial No. 512,950 (Case A) I have illustrated and described a construction of furnaces and ovens of the kind and for the purposes named whose initial cost is considerably less than that of present designs of such furnaces and ovens but whose durability or life nevertheless is much longer, which are so constructed as to automatically take care of the expansion and contraction of the walls which occur when the furnaces are being heated up or cooled down, and in which the loss of heat by radiation is reduced, thereby effecting economy in the consumption of fuel, said furnaces or ovens comprising a stable structure formed by walls which, in lieu of being rectangular in cross section, are in the form of a circle, ellipse, or other continuous-curve form approximately a circle or ellipse, and consisting of a continuous inner wall built up of refractory brick or blocks and being under compression, and an outer continuous-curve sheet metal casing or shell surrounding the compression wall and forming a tension member which resists radial and tangential stresses due to the expansion of the compression wall, said stable structure being such as to automatically take care of the expansions and contractions which occur when the furnace is being heated up or cooled down.

In the application above identified various forms of continuous-curve furnaces are illustrated and described, all of said forms being generically claimed, and some of them being specifically claimed. The present application covers some of the forms illustrated in the above identified application, but not specifically claimed therein, and in which the stresses due to changes in size of the inner compression wall and of any transverse arches, caused by expansion or contraction, are automatically compensated for by a change in shape of the cross section of the furnace. This invention, as that of the above identified application, is applicable to all furnaces and ovens of the character specified whether of the direct heating, semi-muffled, or muffled type.

Figure 2:
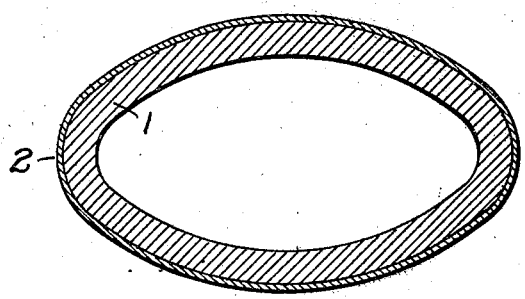
Figure 3:
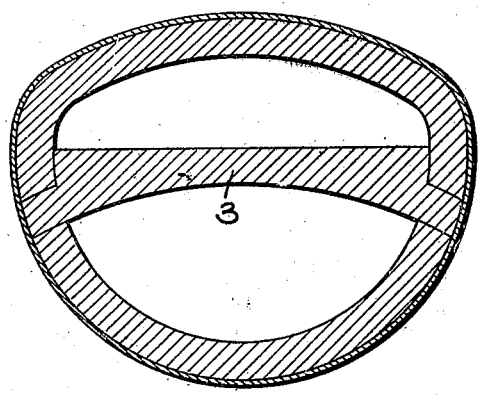
Figure 4:
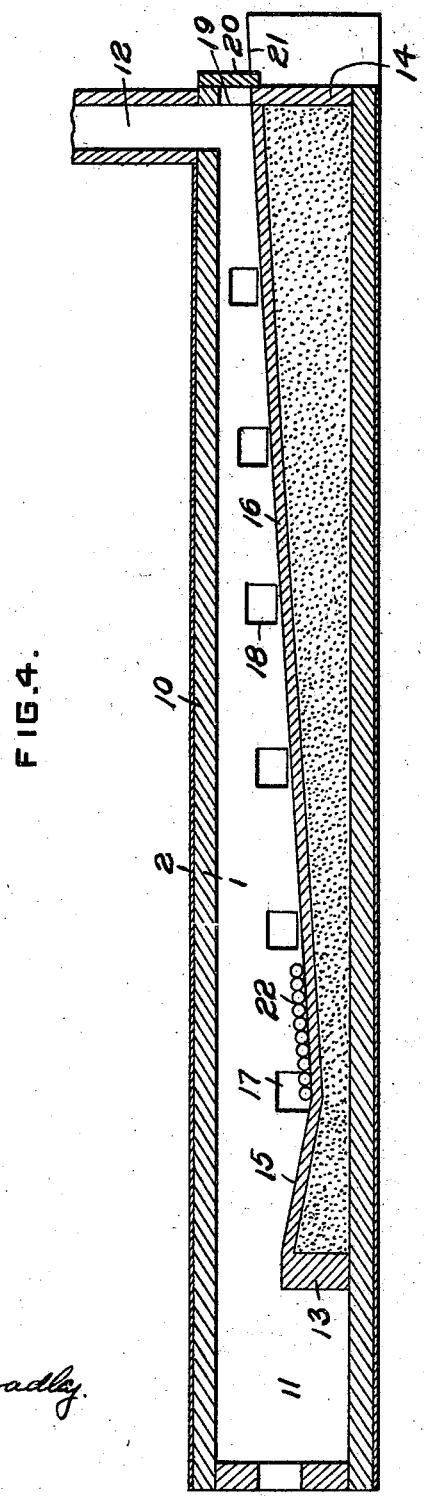

In the accompanying drawings, Fig. 1 is a transverse sectional view through the body of a furnace embodying the invention; Fig. 2 a similar view in which the shape of the cross-section is elliptical; Fig. 3 a corresponding view through a furnace having a transverse arch and in which the roof portion only is in the form of a flattened arc of a circle; and Fig. 4 is a vertical longitudinal sectional view showing the invention applied to a billet heating furnace.

In each of the forms shown, 1 designates an inner wall built up of refractory material, preferably refractory brick or blocks, comprising an inner compression wall encased in an outer sheet metal casing or shell 2 forming a tension member resisting radial and tangential stresses.

The advantages of the constructions illustrated are most fully realized in the form shown in Fig. 2, in which the furnace is elliptical in cross section, both the hearth and roof portions being substantially alike, thus forming a symmetrical construction, both being flattened arcs of a circle. When such furnace is heated up the inner compression wall expands, thus increasing the perimeter of said wall and also increasing the stresses set up thereby. The result is that the furnace wall as a whole will assume a shape more nearly circular, due to the fact that a greater volume of refractory material can be disposed within the outer shell when the latter is in circular form than when in elliptical form. Consequently under the expansions due to heating up of the furnace walls, the latter in cross sectional exterior shape decreases in horizontal diameter and increases in vertical diameter. It will thus be seen that with this cross sectional form the expansion and contraction is automatically taken care of by a mere change in shape of the cross section of the furnace, thus providing an exceedingly flexible construction making it unnecessary to use any special means to allow for the expansion, such as compressible linings, slip joints or other constructions.

In the form shown in Fig. 1, the bottom or hearth alone is made as a flattened arc of a circle, thus forming a dish or concave shaped hearth, the roof being semi-circular. In the form shown in Fig. 3 the bottom portion is semi-circular, while the roof portion is in the form of a flattened arc of a circle, and in addition a transverse arch 3, also in the form of a flattened arc of a circle, is sprung across the same and is made flat on its upper surface so as to adapt it as a supporting surface. In both of these forms, however, a portion of the body in cross section is in the form of a flattened arc of a circle, and therefore lateral stresses are set up due to such shape, for similar reasons as in the form shown in Fig. 2. Consequently the outer shell or casing 2 is always under considerable tension, and because a portion of the furnace wall is a continuous-curve which is a flattened arc of a circle, a mere change in shape thereof which more nearly approaches a truly circular form will accommodate a larger volume of compression wall. Consequently in all forms illustrated advantage is taken of the cross sectional shape of the furnace to automatically compensate for any changes in the furnace wall due to expansion or contraction during the heating up or cooling down of the furnace.

Fig. 4 illustrates the invention embodied in a billet heating furnace which is indicative of the direct heating type of furnace, and as shown, consists of a longitudinal wall portion 10 with the combustion chamber 11 located at one end and communicating at its other end with the stack 12. An upright wall 13 forming one side of the combustion chamber is mounted upon the floor of the furnace and extending from said wall to the end 14 at a point directly beneath the stack is an inclined support 15—16, each portion 15 and 16 sloping downwardly to a point in alignment with the discharge opening 17. A series of observation openings 18 is provided in the side wall, and the end wall 14 is equipped with an opening 19 having a door 20 to close the same. For convenience in feeding the billets to the furnace, a charging table 21 is provided adjacent the charging door.

In the operation of this embodiment, the billets indicated by the reference numeral 22 are conveyed into the furnace through the opening 19 and move down the inclined portion 16 of support 15—16 towards the discharge opening 17. The heated products of combustion pass between the support and the roof on their way to the stack, heating the billets located upon the support. The conditions within the furnace may be observed, whenever desired, through the observation openings 18, the billets being removed through the discharge opening 17.

The advantages of the invention are prevention of the disintegration and burning out of the refractory wall, reduction in the quantity of material required, in original construction with a corresponding decrease in cost of material and labor for installation; decreased cost of repair and replacement; the elimination of the usual expensive skewbacks and buck stays together with their disadvantages; increased comfort and economy due to the confinement of heat; increased life of the furnace; reduction in the weight of the furnace permitting the use of lighter and spaced apart foundations; and the elimination of all special devices for compensating for the changes in size of the inner compression wall due to expansion and contraction thereof.

We claim:

1. A stationary substantially horizontal furnace or oven comprising a non-circular stable continuous-curve inner wall of refractory material under continuous outward thrust due to the cross-sectional shape thereof and an outer metal shell for maintaining the inner wall under compression against said thrust and resisting stresses due to expansion therof.

2. A stationary substantially horizontal furnace or oven of the kind described comprising a non-circular stable structure which in cross section is a continuous-curve wall, a portion of which is a flattened arc of a circle constantly producing outward thrust and consisting of an inner wall built up of refractory brick or blocks and forming a compression member, and an outer annular sheet metal shell surrounding said compression wall and forming a tension member to resist radial and tangential stresses due to said outward thrust and expansion of the compression wall, said flattened arc portion of the wall permitting automatic expansion and contraction of the wall without permanent deformation.

3. A stationary substantially horizontal furnace or oven comprising a non-circular stable continuous-curve inner wall of refractory material constantly under outward thrust, due to the cross-sectional shape thereof, and an outer metal shell for maintaining the inner wall under compression against said thrust but permitting expansion and contraction thereof.

4. A stationary substantially horizontal furnace or oven comprising a non-circular stable continuous-curve inner wall of refractory material constantly under outward thrust due to the cross sectional shape thereof, and an outer metal shell for maintaining the inner wall under compression against said thrust and resisting stresses due to expansion thereof, and means for permitting unequal ratios of expansion of the two walls while maintaining said compression.

5. A stationary substantially horizontal furnace or oven of the kind described comprising a non-circular stable structure which in cross section is a continuous-curve wall and whose upper portion is a semi-ellipse constantly producing outward thrust consisting of an inner wall built up of refractory brick or blocks and forming a compression member, and an outer sheet metal shell surrounding said compression wall and forming a tension member to resist stresses due to said outward thrust and the expansion of the compression wall.

6. A stationary substantially horizontal furnace or oven of the kind described comprising a non-circular stable structure which in cross section is substantially an ellipse constantly producing outward thrust consisting of an inner wall built up of refractory brick or blocks and forming a compression member, and an outer curved sheet metal shell surrounding said compression wall and forming a tension member to resist stresses due to said outward thrust and expansion of the compression wall.

7. A stationary substantially horizontal furnace or oven of the kind described comprising a stable structure which in cross section is a non-circular continuous-curve wall and which includes an arch formed on a chord of a circle and constantly exerting outward thrusts consisting of an inner wall built up of refractory brick or blocks and forming a compression member, and an outer sheet metal shell surrounding said compression wall and forming a tension member resisting the outward thrusts of the arch.

In testimony whereof, we sign our names.

JAMES STUART SNEDDON,
EDWARD R. STETTINIUS,
*Executors of James P. Sneddon, deceased.*